United States Patent
Leslie

[15] 3,701,479
[45] Oct. 31, 1972

[54] INJECTOR VALVE FOR GRANULAR MATERIALS

[72] Inventor: Robert J. Leslie, 3207 Olive Hill Road, Fallbrook, Calif. 92028

[22] Filed: March 18, 1971

[21] Appl. No.: 125,551

Related U.S. Application Data

[63] Continuation-in-part of Ser. No. 860,325, Sept. 23, 1969, abandoned.

[52] U.S. Cl. ...............239/407, 239/424.5, 239/583
[51] Int. Cl. .............................................B05b 7/12
[58] Field of Search......239/403, 405, 407, 412, 423, 239/424.5, 456, 537, 541, 583; 222/522, 504, 193

[56] References Cited

UNITED STATES PATENTS

| | | |
|---|---|---|
| 907,376 | 12/1908 | La May .....................222/193 |
| 3,068,523 | 12/1962 | Adinoff et al..........239/541 X |

*Primary Examiner*—M. Henson Wood, Jr.
*Assistant Examiner*—Edwin D. Grant
*Attorney*—Angus & Mon

[57] ABSTRACT

A valve for controlling the flow of granular material into die cavities for forming and molding of plastic materials. An example is the injection of styrene granules into a die where they will be expanded and bonded together to form a lightweight unitary contoured body. The valve includes a poppet with a central bore through which bore material is fed into the die cavity. The poppet is moved to its opened or closed position by air under pressure, and air which opens the poppet is also used to convey the granular material out of the bore and into the die cavity. To improve distribution of the material in the die cavity, the exit end of the poppet bore is provided with a deflector section. Restrictor means may be provided in the air passages to the poppet to smooth out the opening and closing of the valve under the substantial air pressures and volumes required for actuation and injection.

12 Claims, 8 Drawing Figures

PATENTED OCT 31 1972 3,701,479

INVENTOR.
ROBERT J. LESLIE
BY
Angus & Mon
ATTORNEYS.

INVENTOR.
ROBERT J. LESLIE

BY
ATTORNEYS.

INJECTOR VALVE FOR GRANULAR MATERIALS

CROSS-REFERENCES TO OTHER PATENT APPLICATIONS

This is a continuation-in-part of applicant's co-pending U.S. patent application Ser. No. 860,325 filed Sept. 23, 1969, entitled "Injector Valve for Granular Materials", now abandoned

DESCRIPTION

This invention relates to valves for the injection of granular material.

An object of this invention is to provide a valve that will utilize air pressure for its opening and closing and to use its actuating air also to inject and disperse granular material into a region of use.

A further object of this invention is to provide a valve to inject granular material uniformly into a cavity or place of use in a mixed, homogenous condition, the valve being optimally short so as to enable it most conveniently to be mounted to a mold or machine.

Figure 1:
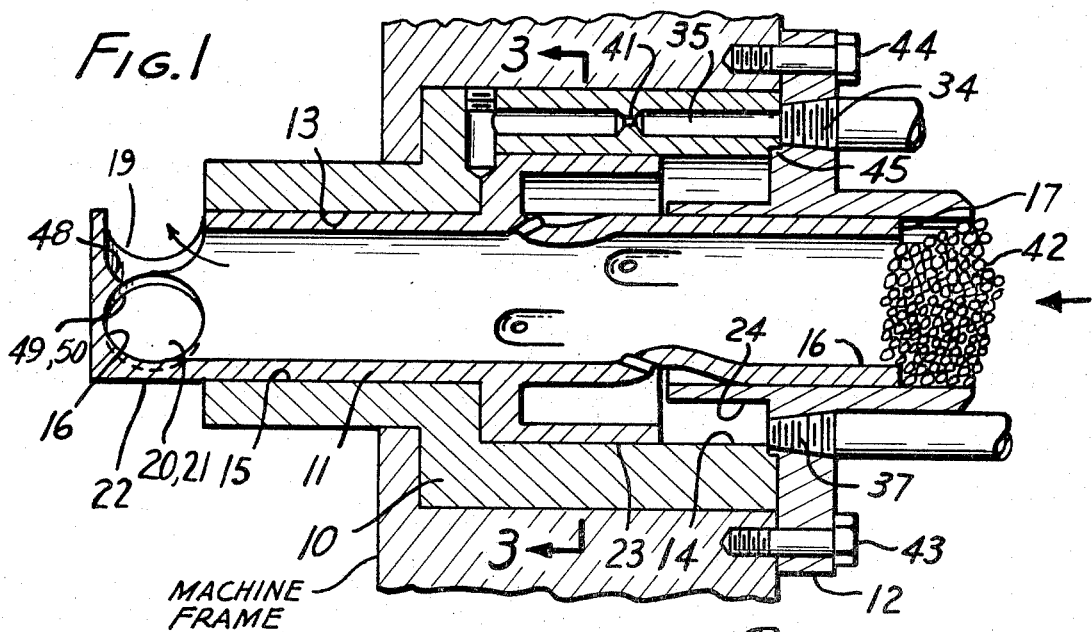
FIG. 1 is a cross section of the side elevation of an embodiment of the invention.

One embodiment of this invention as shown in FIG. 1 has three basic parts: a body member 10, a valve poppet 11 and a cap member 12. The body member 10 is provided with a bore 13 which is enlarged at a first end to form a cylinder 14, and a smaller diameter bore 15 which carries out the sealing function of the valve in conjunction with the valve poppet 11.

The valve poppet 11 has a bore 16 formed partially therethrough, which starts at the first end 17 of the poppet and ends at a deflector section 18 which is formed at the second end. Opening transversely relative to the axis of the bore are three injection ports 19, 20 and 21, which function as material distribution ports. Poppet diameter 22 makes a sliding, sealing fit with the smaller bore 15 of the body member 10. Tubular piston portion 23 makes a sliding engagement with the wall of cylinder 14.

The cap member 12 has a tubular section which is formed coaxially with the poppet 11. The tubular section 24 is open toward the first end 17 of the poppet 11. A solid web section 25 of the cylindrical piston portion 23 caps off the end of the cavity formed by the tubular section 24 to complete the piston means. Tubular section 24 telescopically fits the outside of the poppet, and in the closed position of the valve shown in FIG. 2 enters chamber 26 formed within portion 23 and overlays dimples 27, 28, and 29 which are formed in the body 30 of the poppet that open into this chamber. Air inlet holes 31, 32 and 33 are drilled into the dimples into the poppet bore, but they are skew to the axis, so that air is guided into these holes and into the bore 16 in a swirling motion.

Cap member 12 has a port 34, and the body member 10 has an air passage 35 which conducts air into the body chamber 36 which air will act upon one side of piston 23 for closing the valve. The cap member 12 has another port 37 which admits air into the tubular section 24 of the cylindrical piston 23 that forms chamber 26 for opening the valve and for admitting air through holes 31, 32 and 33 for forcing the granular material through the material distribution ports 19, 20 and 21. Body member 10 may conveniently be nested in a machine frame, and the cap member 12 fastened to the frame. Bolts 43 and 44 provide mounting and closure of the valve bores simultaneously.

Key means 45 is provided to retain alignment of port 34 with air passage 35. Dimples 27, 28, and 29 help guide the flow of air into holes 31, 32 and 33. A restriction 41 may be formed in air passage 35 to cushion the opening and closing of the valve. When the valve is to be closed, positive pressure is applied at port 34, and the restrictor limits the rate of air flow into chamber 36. When the valve is to be opened, positive pressure is applied at port 37, and the restrictor limits the rate of flow out of chamber 36. The effect in both directions of air flow is to reduce the velocity of the poppet relative to what it would be without the restrictor. The port at which the positive pressure is not exerted is vented to atmosphere, "positive pressure" meaning a pressure in the respective port which is greater than that in the other.

Figure 2:
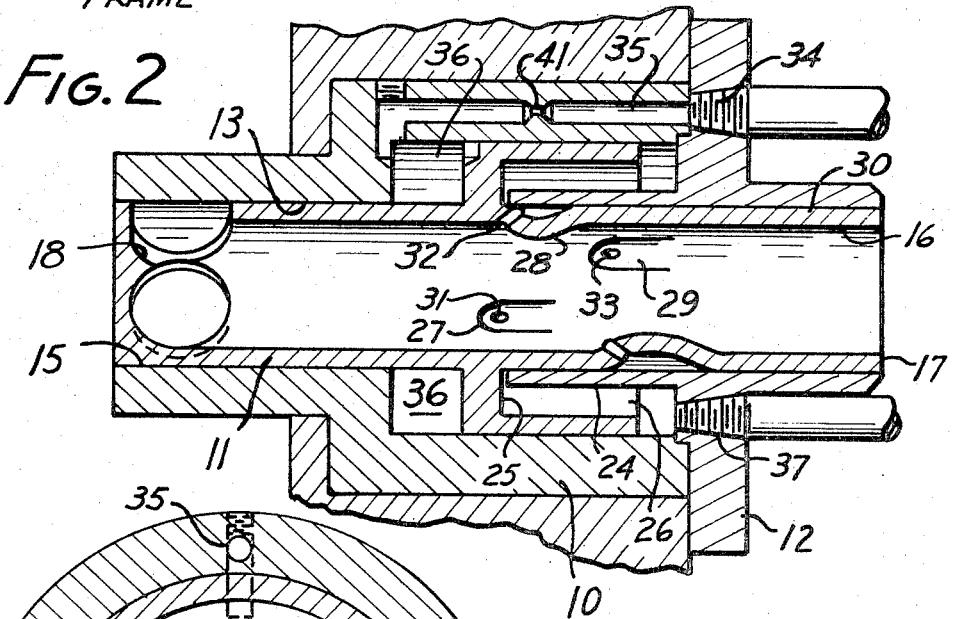
FIG. 2 is a side elevation of the embodiment of FIG. 1, in cross section, with parts translated to the closed position.
Figure 3:
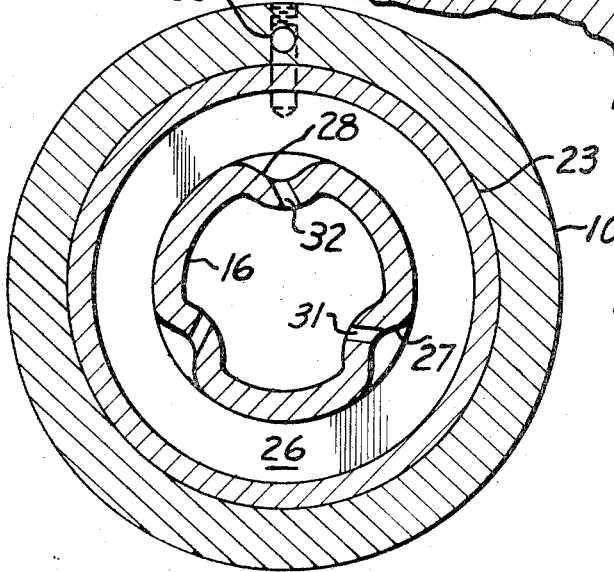
FIG. 3 is a cross section of the embodiment of FIG. 1 taken on line 3—3.
Figure 4:
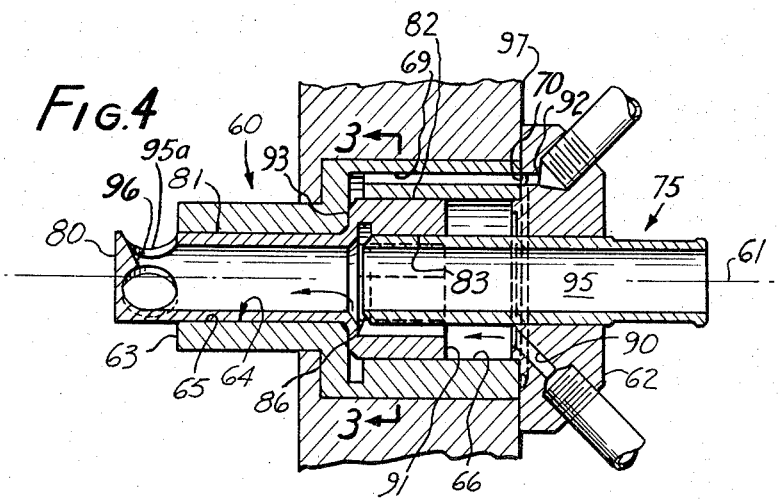
FIG. 4 is an axial section taken at line 5—5 of FIG. 7 of the presently-preferred embodiment of the invention in its open position.
Figure 5:
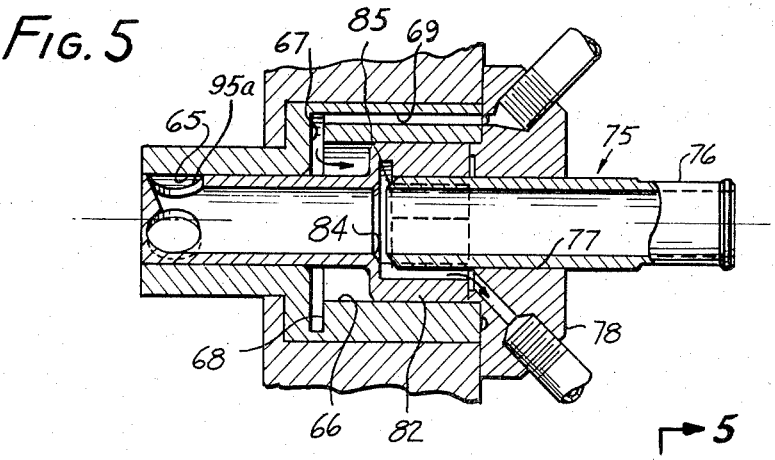
FIG. 5 is a view as in FIG. 4, but with the valve in its closed position.
Figure 6:
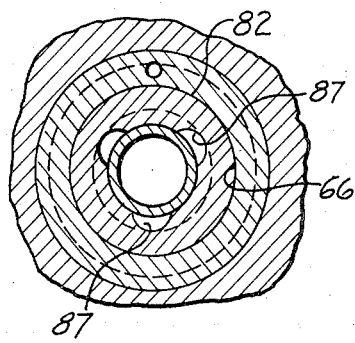
FIG. 6 is a cross section taken at line 6—6 of FIG. 4.
Figure 7:
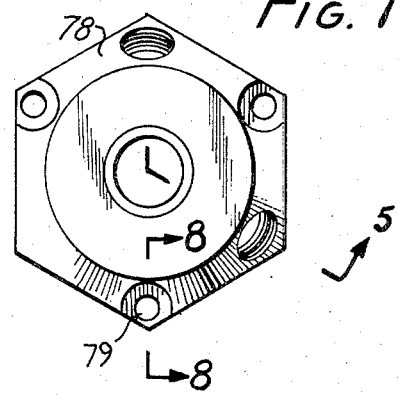
FIG. 7 is a right hand end view of FIG. 1.
Figure 8:
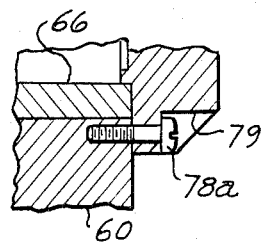
FIG. 8 is a partial section taken at line 8—8 of FIG. 7.

The valve is shown in its closed position in FIG. 2. Upon the introduction of air through port 37 the air acts upon the piston means to push the poppet forward to the position shown in FIG. 1, freeing distribution ports 19, 20 and 21. As the valve opens in this manner, air is free to enter through holes 31, 32 and 33 into the bore of poppet, because these holes have been moved beyond tubular portion 24. The flow of air is given a swirling motion and picks up granular material 42 from the storage means which material enters the bore of the poppet, such as from a hopper, and carries the granular material in a swirling mixture of air and granular material 42 through the injection ports 19, 20, and 21. This mixture of air and granules first hits the material deflection section 16 which is formed with concaved curved surfaces 43, 44 and 45 which tend to distribute the material evenly through the three injection ports. The concavely curved material deflection sections 48, 49 and 50 are formed to face their respective material distribution ports.

When the material injection cycle is complete, air is admitted through port 34 into air passage 35 to act upon the piston means to shift the poppet so that the material distribution ports are sealed off by the wall of bore 15 of the valve body. It is to be understood that in admitting air through port 34, port 37 must be open to the atmosphere to allow trapped air to escape. It is also to be understood that external restrictions may be placed in the air lines to restrict the flow of air. When the valve is closed, tubular portion 24 of the cap member 12 acts to seal off the air inlet holes 31, 32 and 33 so that material cannot backflow from the bore of the poppet into the line through which exhausted air from the cylindrical piston area 26 is moving.

The presently preferred embodiment of this invention is shown in FIGS. 4-8. It includes a body member 60 having a central axis 61, a first end 62 and a second end 63. A bore 64 passes through the body. It has a smaller diameter section 65 and an enlarged cylinder 66, which meet at an internal shoulder 67. An undercut groove 68 is formed adjacent to the shoulder. An extension 69 of an air passage means is formed in the wall of the cylinder, and has an opening 70 at the second end. It opens into the undercut groove.

A poppet member 75 makes a sliding fluid sealing fit in the bore. A first tubular element 76 is cylindrical, and extends through an opening 77 in a cap member 78. The cap member is attached to the body member by screws 78a passed through holes 79 in the cap member. The first tubular element makes a sliding fluid sealing fit with the end cap.

The poppet further includes a second tubular element 80, which includes a neck 81 that passes through and makes a close sliding fit with section 65 of the bore. It includes a piston 82 of substantial axial length sufficient to stabilize the poppet member against cocking. The piston makes a sliding fluid sealing fit in cylinder 66. Differential air pressure on respective sides of the piston will move the poppet member in the respective direction.

An aperture 83 is formed in the piston end of the second tubular element. A chamfer 84 is formed at its base. A matching chamfer 85 is formed on the adjacent end of the first tubular element. The tubular elements are pressed together in telescopic relationship, and the two chamfers are spaced apart, leaving a fully peripheral slot 86 (sometimes herein called an "air inlet port") which, by virtue of the shape of the chamfers, extends toward the second end while extending toward the axis. This slot is in fluid communication with the cylinder at the first end of the piston by means of air conduits 87 formed as longitudinal grooves in the inner wall of the piston. The slot thereby receives air from the first end of the cylinder, which is also the air which will open the valve.

Air passage means 90 pass through the end cap and directly enter the first end of the cylinder to convey air to the first face 91 of the piston. Air passage means 92 pass through the end cap and connect to extension 69 to convey air to the second face 93 of the piston.

The poppet member is assembled simply by providing an interference fit between its two tubular elements and pressing them together until a gauge shows the slot to be of the proper width. The inner wall of the piston tightly embraces the first tubular element, and further fastening is rarely necessary.

A bore 95 passes through the poppet member to receive granular material to be dispensed. One end of the bore is closed, but its wall has a plurality of radial injection ports 95a to discharge material from bore 95 when the valve is open and they are outside the body member. Ports 95a are closed when the poppet is moved to the position of FIG. 2, having been drawn into section 65 of the body bore. Deflector segments 96 direct the material radially at these ports.

This valve is readily manufactured and assembled. The full peripheral slit does not readily clog, and it is unnecessary to provide valving means for it such as tubular section 24 in the embodiment of FIG. 1.

If desired, a restrictor may be provided in either or both of passages 90 or 92, 69 to cushion the valve at the end of its stroke.

As in the device of FIG. 1, material is supplied at the first end (right hand end of FIG. 4) and conveyed by gravity or otherwise into the poppet member. When the valve is to deliver, pressure is applied at passage 90, and vented at passage 92. This shifts the poppet to the position of FIG. 4, and the same actuating air blows the material through the poppet bore and out the injection ports. The shape of the slot assures the downstream movement.

When the valve is to be closed, air is vented at passage 90, and pressure is applied at passage 92. This shifts the poppet to the position of FIG. 2, closing the injection ports. Also there is no ejection pressure in passage 90, although there could be enough to balance any net pressure in the poppet bore which might move material into the slot, if desired, it being only necessary to adjust the pressure in passage 92 high enough to counterbalance any tendency to open the valve. Such supplementary pressure is rarely necessary.

The valve may be used wherever desired, but ordinarily will simply be fitted into an aperture 96 in the wall of a mold 97.

This device is a convenient poppet actuated injector valve suitable for pelletized material which otherwise can be very difficult to inject in such a manner so to be uniformly distributed in a mold.

This valve, by axially overlapping its elements, such as the piston and the bore of the poppet member, shortens the valve structure. Such shortness is a great convenience in mounting the valve to a mold or machine, because it reduces the clearances needed around the structure to which it is mounted.

Still a further advantage lies in the fact that material flows straight through the valve until it reaches the injection ports. Eliminating changes of direction, which are common in conventional valves, greatly reduces the risk of clogging of the flow of granular materials.

Still another advantage inherent in this invention is that the entry of air into the bore creates a powerful venturi action and expulsion action which in themselves can move pelleted or granular material, so that a gravity feed to the valve can be used without a screw feed or other mechanical or pressure supply boost from the hopper supplying the valve. In fact, pellets for steam expanded styrene molding can be lifted several feet through a hose and reliably fed by this valve. This action is especially pronounced in the embodiment of FIGS. 4-8, because of the full peripheral air discharge with its substantial downstream component.

This invention is not to be limited by the embodiments shown in the drawings and described in the description, which are given by way of example and not of limitation, but only in accordance with the scope of the accompanying claims.

I claim:

1. A valve for injection of material which comprises: a body member having a central axis, said body member having an axial bore therethrough, said bore having a first and a second end, said first end of said bore forming a cylinder; a poppet member, said poppet member having a bore partially therethrough, said poppet member having a first end and a second end, said poppet member having a external diameter at its second end which is adapted for sliding fit with said body member bore at said second end of said body member, said poppet member being provided with a plurality of radial injection ports adjacent to said second end of said poppet member and intersecting said bore of said poppet member to discharge material received from the bore in the poppet member under pressure when the injection ports are moved outside the bore of the body member, said poppet member carrying an externally peripheral piston making a fluid-sealing sliding fit in said cylinder, said piston extending axially along the poppet member, an air inlet port through said poppet member communicating its bore with the outside of the poppet member at an axial location within the length of the piston, said piston being formed with a conduit to convey air from one side of the piston to the said air inlet hole; a cap member, said cap member being adapted to seal said cylinder at the first end of the body member bore, first and second air passage means through the valve opening into the cylinder on opposite sides of the piston, the poppet member making a sliding fluid-sealing fit in a passage through the cap member, its bore opening outside the cap member to receive material to be distributed by the valve.

2. A valve according to claim 1 in which the air inlet port comprises a peripheral slot bounded by walls which slant toward the second end as they extend toward the central axis, and in which said air conduit extends axially through the piston to the said slot from the side of the piston closer to the first end.

3. A valve according to claim 1 in which the poppet is formed of a first and a second tubular element, the first tubular element passing through the cap member with a first end outside of the cylinder, and its second end inside of the same, a chamfer on the second end of the first tubular element, the second tubular element including the piston, and having a chamfer recessed from the end of the piston closer to the first end of the poppet member bounding the bore therethrough, the first tubular element being fitted into the second tubular element so the chamfers are spaced apart and bound a peripheral air inlet port in the shape of a slot which slants toward the second end as it extends toward the axis, said air conduit extending axially from the slot to the end of the piston closer to the first end of the valve.

4. A valve according to claim 3 in which the air conduit is formed as a longitudinal groove in the wall of one of the tubular elements.

5. A valve according to claim 3 in which the air passage means are formed in the cap member, one opening directly into the cylinder, and the other aligning with an extension in the body member opening into said cylinder.

6. A valve according to claim 5 in which the air conduit is formed as a longitudinal groove in the wall of one of the tubular elements.

7. A valve according to claim 4 in which the said extension of one of the air passage means terminates in an undercut groove adjacent to the end of the cylinder farthest from the said first end.

8. A valve for the dispersion of material which comprises: a body member, said body member having a bore therethrough, said bore having a first and a second end, said first end of said bore forming a cylinder; a poppet member, said poppet member having a bore partially therethrough, said poppet member having a first end and a second end, said poppet member having an external diameter at its second end which is adapted for sliding fit with said body member bore at said second end of said body member, said poppet member being provided with a multiplicity of radial injection ports adjacent to said second end of said poppet member and intersecting said bore of said poppet member to discharge material received from the bore in the poppet member under pressure when the injection ports are moved outside the bore of the body member, said poppet member having piston means adapted to slidably fit in the said cylinder, said piston means being of tubular section extending around and laterally spaced from said poppet member to form a chamber around said poppet member, an air inlet port in said poppet member communicating its bore with said chamber of said piston means to admit air into said bore of said poppet member; a cap member, said cap member being adapted to seal said first end of said body member bore, said cap member having a first and a second port; air passage means in said body member adapted to admit air to said cylinder on one side of the piston means, said cap member having one of its said ports connected to said air passage, the other of said ports in the cap member being connected to the cylinder at the opposite side of said piston means, said cap member having a tubular section coaxial with said poppet member, said tubular section adapted to slide over said first end of said poppet member into said chamber formed by said tubular section of said cylindrical piston means, and said tubular section being adapted to seal said air inlet port when the injection ports are closed by being moved into the bore of the body member.

9. Apparatus according to claim 8 which further includes: a deformed area on said first end of said poppet member disposed within said chamber formed by said tubular section of said piston means when the valve is closed, said deformed area surrounding said air inlet port to encourage the flow of air into said inlet port.

10. A valve according to claim 8 which further includes: deflection surfaces adjacent to said injection ports to urge injected material in even dispersion through said injection port holes.

11. A valve according to claim 9 which further includes: said air inlet port in said poppet member being formed at directions non-intersecting with the longitudinal axis of said poppet member, said air inlet port being adapted to produce a swirling motion of injected air.

12. A valve according to claim 8 which further includes: restriction means in said air passage of said body member adapted to cushion valve operation.

* * * * *